United States Patent [19]

Narbaits-Jaureguy

[11] 3,780,221

[45] Dec. 18, 1973

[54] MEASURING OF THE COORDINATES OF A SUBJECT THROUGH A TELEVISION RECEIVER

[76] Inventor: Jean Raymond Narbaits-Jaureguy, 1, Rue Louis Mercier, Malakoff, France

[22] Filed: June 8, 1964

[21] Appl. No.: 373,577

[30] Foreign Application Priority Data
June 7, 1963 France .......................... 63937296

[52] U.S. Cl. .............................. 178/6.8, 343/5 EM
[51] Int. Cl. ................................................ H04n 3/00
[58] Field of Search ....................... 343/5 EM, 5 EI; 178/6, 6.8; 235/183, 197; 340/324.4

[56] References Cited
UNITED STATES PATENTS

| | | | |
|---|---|---|---|
| 2,403,975 | 7/1946 | Graham | 178/6.8 |
| 2,581,589 | 1/1952 | Herbst | 178/6.8 |
| 2,675,471 | 4/1954 | Berry | 235/183 X |
| 2,734,269 | 2/1956 | Claret | 178/6.8 |
| 2,938,949 | 5/1960 | Vosburgh | 178/6.8 |
| 2,950,052 | 8/1960 | Knox | 235/183 X |
| 2,970,187 | 1/1961 | Hinton | 178/6.8 |
| 2,057,953 | 10/1962 | Guerth | 178/6.8 |
| 3,076,120 | 1/1963 | Matthew | 343/.5 X |

Primary Examiner—Maynard R. Wilbur
Assistant Examiner—S. C. Buczinski
Attorney—Watson, Cole, Grindle & Watson

EXEMPLARY CLAIM

1. Apparatus for measuring the bearing or elevation of a target displayed on a television screen, comprising a television camera for scanning the area of the target and providing a video signal to a receiver with a cathode ray tube, and, for each bearing or elevation axis, a first saw-tooth generator energised respectively during the synchronisation cycle of the receiver by a synchronising signal, a plurality of selectors comprising triggers successively actuated by a plurality of separate increasing voltages of said saw-tooth signal, a corresponding plurality of slope modifiers each comprising in series an electronic switch and a capacity or a resistance placed in parallel with respect to each other, an integrator R/C incorporating these capacities or resistances and providing a distorted saw-tooth signal, a trip circuit which operates when the voltage of said distorted saw-tooth signal exceeds an adjustable reference voltage and provides a pip signal, a voltmeter measuring said reference voltage, a generator of short pulses of predetermined length energized by said latter trip circuit, and a mixer for adding the video signal and said short pulse and suppling the whole to the T.V. receiver.

2 Claims, 6 Drawing Figures

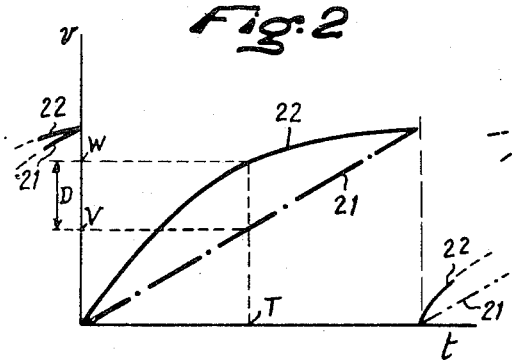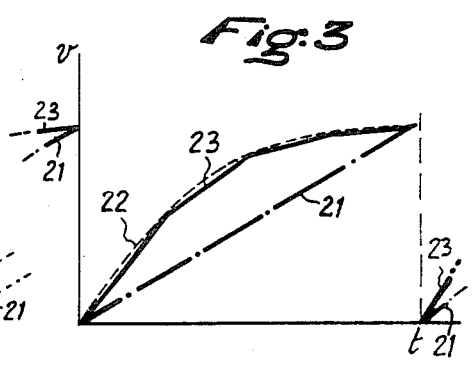

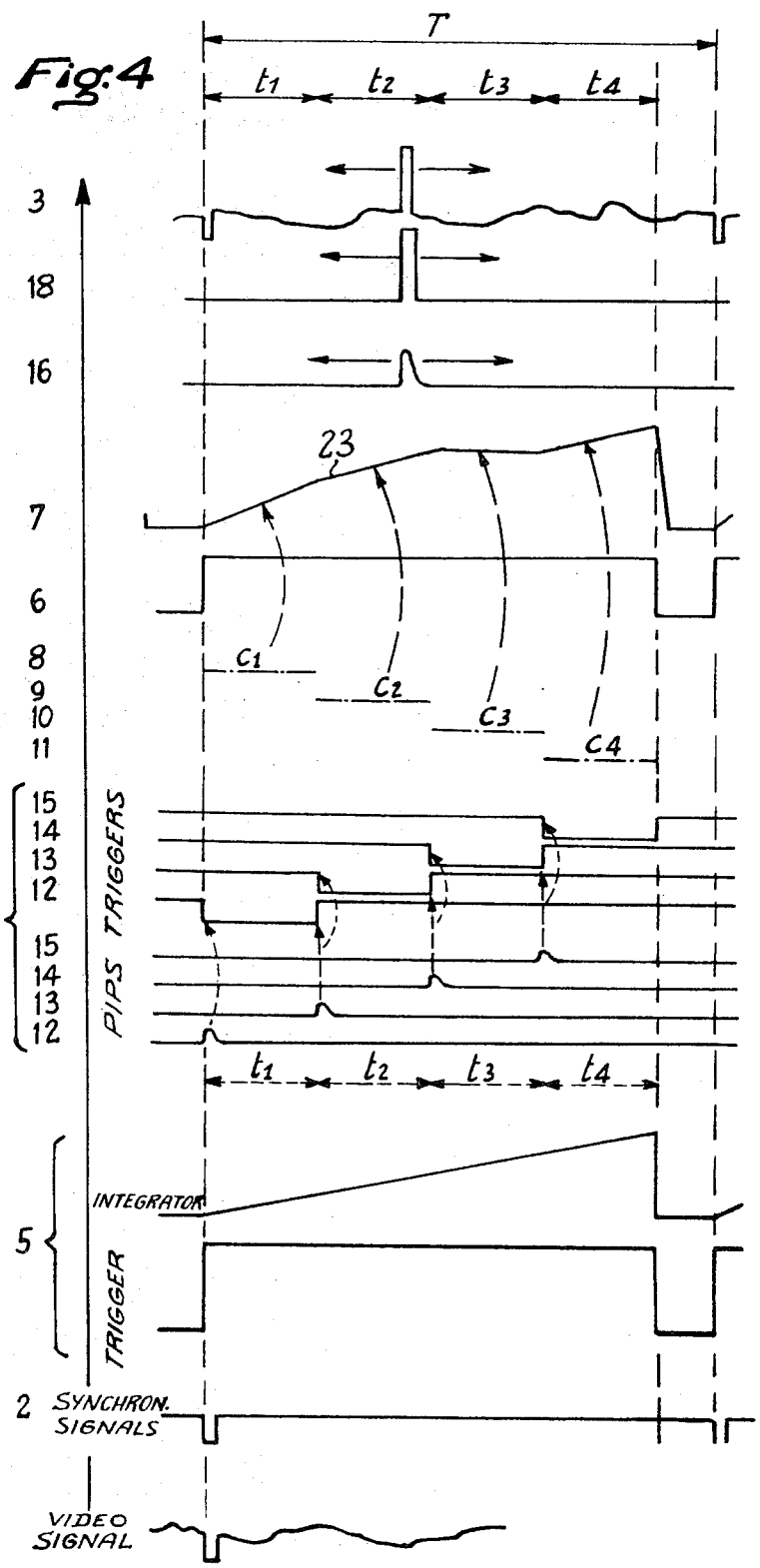

MEASURING OF THE COORDINATES OF A SUBJECT THROUGH A TELEVISION RECEIVER

This invention relates to apparatus for measuring a co-ordinate of a target in an area scanned by a television camera and displayed on the screen of a television receiver associated with the camera.

In modern target detection apparatus it is often required to know a co-ordinate or the co-ordinates of a moving target quickly and with a high degree of accuracy.

One method of obtaining such co-ordinates is described and claimed in copending application Ser. No. 341,134 of Jan.29,1964, now abandoned.

In said copending application is described a method of measuring the co-ordinates of a target subject whose image is transmitted by television, by superimposing on the target area viewed the image of a graduated scale by means of an optical system independent from the optical system of the camera. With such an arrangement the target area image and the scale image are transmitted together between the camera and the receiver and thus any distortion produced by the optical system and the electrical transmission will influence the displayed picture of the target area and the scale image equally. It is well understood that optical systems, such as single lenses, do not give an image homothetic to a target, and that T.V. apparatus give a displayed image distorted, for example, by a non-perfect line and frame sweeping in the camera or receiver, or by the curve of the screen of the latter. Thus by reading the scale image in the picture a true measure of a target's co-ordinates will be obtained as both the target image and scale will, if distorted, be distorted to the same extent. The co-ordinates are usually expressed in terms of elevation and bearing, commonly termed azimuth, and it is with such co-ordinates that the present invention is primarily concerned.

An object of this invention is the provision of improved apparatus for measuring a co-ordinate of a televised target image.

The present invention includes in its broadest aspect, apparatus for measuring a co-ordinate of a target displayed on a television receiver, comprising a television camera for scanning the area of the target and providing a video signal representative of the scanned area, a generator providing an electrical non-linear saw-tooth output waveform in synchronism with the scan, a controller providing an adjustable electrical reference value, a trip circuit connected to receive the reference value and the non-linear saw-tooth waveform and adapted to trip when a predetermined relationship exists between them and initiate an electrical pulse, a mixer connected to mix the pulse with the video output from the camera, a television receiver connected to the mixer and for displaying the video-signal as a picture of the scanned area and the pulse as a marker on the picture, means for adjusting the reference value from the controller to move the marker and register it with a chosen target in the picture, and an indicator controlled by the reference value and indicating the actual value of the ordinate of the target.

Preferably two markers, in the form of mutually perpendicular traces, are provided one for bearing and one for elevation. By adjusting controllers the two traces can be registered on a target and its elevation and bearing may then be accurately read from the indicators.

Conveniently the indicators or meters comprise voltmeters calibrated in terms of bearing and elevation, respectively, and controlled by the reference values of the controllers expressed as voltages.

The shape of the non-linear saw-tooth is determined, usually empirically, in such a way that the output voltage from the trip circuit is proportional to a co-ordinate of the position of the marker on the receiver and thus of a target with which the marker is registered, independently of the position of the marker on the receiver screen.

The invention is particularly suited with television apparatus employing optical markers as is described in our copending application Ser. No. 341,134. However the invention is equally suitable for use with other apparatus not employing optical markers.

The invention will now be described in more detail, by way of example, with reference to the accompanying drawings, in which:

FIG. 2 shows theoretical curves of voltage against time; and

FIG. 3 shows practical curves of voltage against time.

FIG. 4 is a graphic illustration of the waveforms produced through one of the bearing or elevation networks;

Figure 1:
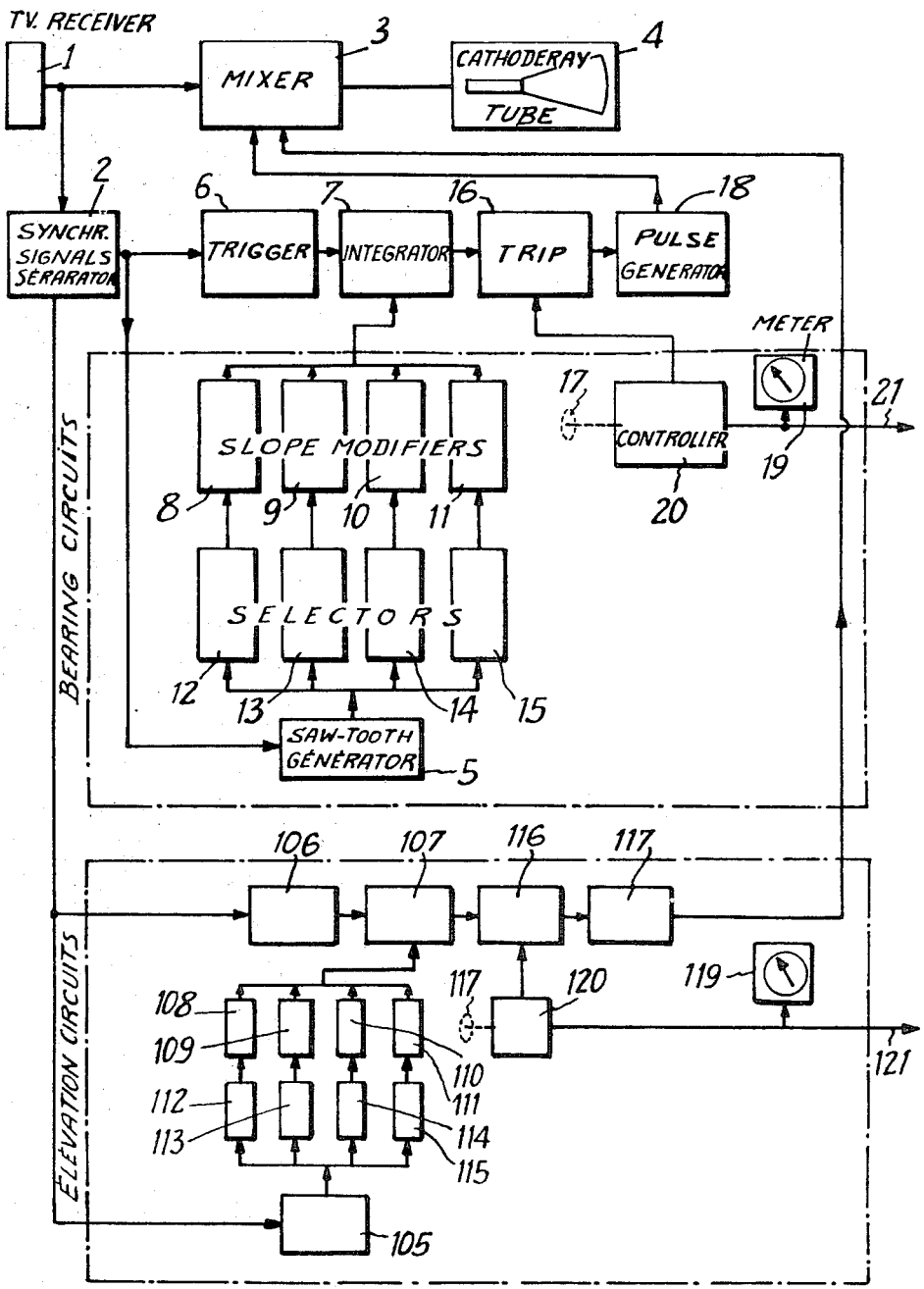
FIG. 1 is a block diagram of apparatus for determining the elevation and bearing of a target sighted by a television camera.

The apparatus of FIG. 1 is adapted to give orthogonal co-ordinates of bearing and elevation by similar circuitry and, for simplicity, only the circuitry for giving bearing will be described in detail. This circuitry is denoted by the reference numerals 5 to 21. The corresponding circuitry for giving elevation is denoted by similar reference numerals in the hundred series, and thus is denoted by the reference numerals 105 to 121. It is to be understood that elements 105 to 121 correspond respectively to elements 5 to 21.

The apparatus comprises a television camera 1 for viewing the target area and providing an output composed of a video signal and line and frame synchronizing signals. The video signal is fed to a mixer 3 where it is mixed with electrical marker signals from both the bearing and elevation circuitry. The signals from the mixer 3 are applied to a television receiver 4 which displays the target area and also two mutually perpendicular traces which are produced by the electrical marker signals.

The two traces correspond respectively to bearing and elevation and each is movable parallel to itself by adjustment of the circuitry producing the trace. thus by aligning the traces with a target its bearing and elevatinon may be read off meters as is described below.

The line and frame synchronizing signals in the output from the camera 1 are picked up by a separator 2 which applies one signal to the bearing circuitry composed of the elements 5 – 21 and the other signal to the elevation circuitry composed of the elements 105 – 121.

Considering only the bearing circuitry 5 – 21, the line synchronizing signals from the separator 2 are fed to a saw-tooth line generator 5 and to a trigger circuit 6 which initiates operation of an integrator 7.

Considering only the bearing circuitry 5–21 in FIGS. 1 and 4, the line synchronising signals from the separator 2 are fed to a line saw-tooth generator 5, well known in the art, comprising a trigger providing a constant voltage to a resistance-capacity circuit providing a saw-tooth signal, which initiates operation of another integrator 7 making it possible to produce a modified sawtooth wave, suitably modified as will be seen below. This integrator 7, well known in the art, is similar to the saw-tooth generator 5, and comprises an input receiving a constant voltage and a circuit with a resistance and a capacity, giving at the terminals an output in saw-tooth shape.

The practically linear saw-tooth signal produced by the generator 5 is used to modify the slope of the output signal from integrator 7 through slope-modifiers 8–11, each of which operates for a period determined by selectors 12—15 which are themselves actuated by the saw-tooth output from the generator 5.

Figure 5:
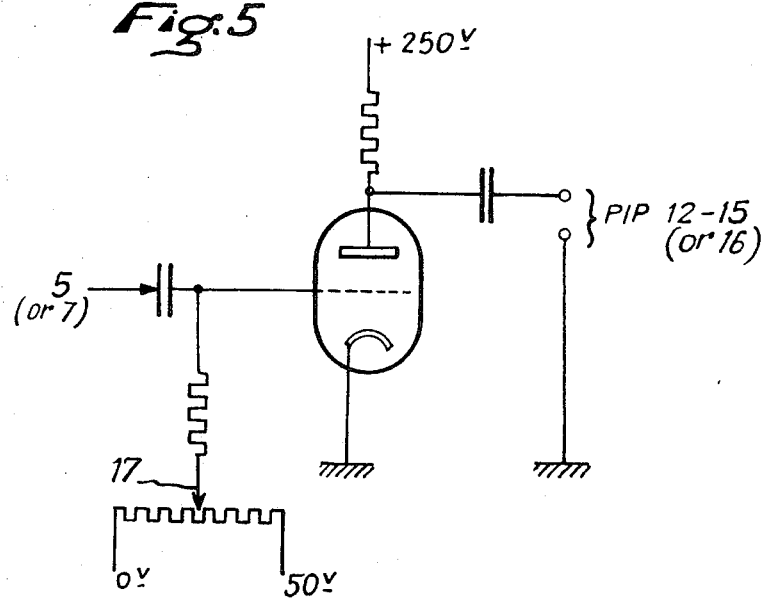
FIG. 5 illustrates an example of a pip delivering electronic device.

In order to do so, each of the selectors 12–15 comprises a generator of pip signals, known in the art and shown in FIG. 5. It consists of a triode the grid of which is set at a cut-off voltage and becomes conductive when the saw-tooth signal applied as an input becomes high enough above the cut-off limit. The triode then delivers a pip signal which controls a known bistable trigger 12–15 setting up a constant tension signal during a preselected delay or until the following pip is issued. Said delays following each other for example as four equal durations $t_1$, $t_2$, $t_3$, $t_4$, during the T.V. sweep cycle.

Figure 6:
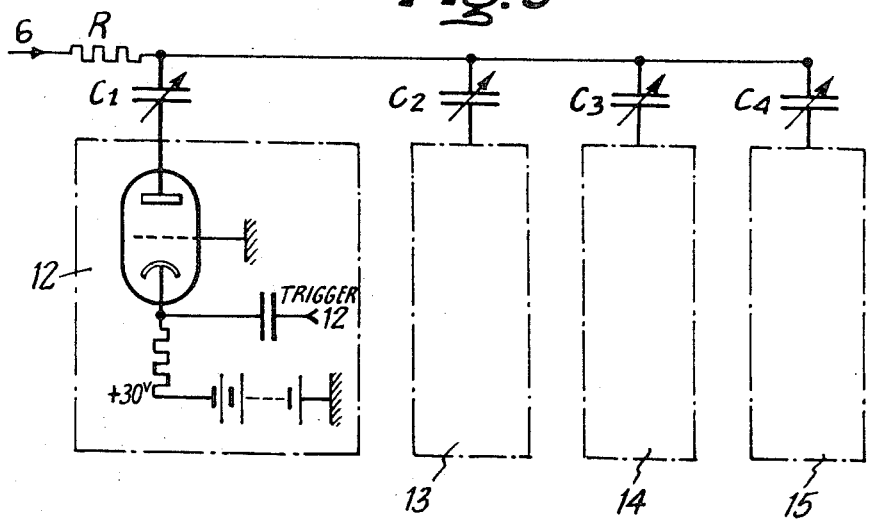
FIG. 6 illustrates an example of slope modifiers and distorted integrator.

The selectors 12–15 control the slope modifiers which are combined with an integrator 7, as shown in FIG. 6. Each slope modifier is an electronic switch which introduces successively adjustable capacities $C_1$, $C_2$, $C_3$ and $C_4$ in the integrator circuit 7. For example, a slope modifier (FIG. 6) consists of a triode which becomes conductive when a signal 12 is applied to it, through a capacity which is set up in the R/C integrator circuit, the capacity of the circuit being successively $C_1$, $C_2$, $C_3$, $C_4$ during the durations $t_1$, $t_2$, $t_3$, $t_4$.

The modified saw-tooth from the integrator 7 is applied as a voltage to a trip circuit 16 which operates when the instantaneous value of the saw-tooth exceeds an adjustable reference voltage. The reference voltage is obtained from a controller 20 having a manually adjustable knob 17 for altering the reference voltage. The value of the reference voltage is indicated by a meter 19 calibrated in terms of bearing and the reference voltage is also applied to a line 21 for use elsewhere.

The trip circuit 16 operates to energise a pulse generator 18 which applies a pulse of predetermined length to the mixer 3 once for each line scan. Each pulse produces a black spot or a bright dot on a line displayed on the receiver 4 and the position of the spot or dot on the line is determined by the instant of operation of the trip circuit 16 which, in turn, is controlled by the controller 20. The bright dots or black spots on the lines form a trace on the display of the receiver and serves as a bearing index which may be fixed or positionally adjustable. The bearing index, when fixed, may be provided with a scale for enabling different bearings to be read off it. When the bearing index is movable it can be positioned over the target the bearing of which is required, and the bearing read off the meter 19.

The operation of the circuitry 105 – 121 for determining the elevation of the target is similar to that described with reference to the circuitry 5 – 21, and a trace at right angles to the bearing trace is obtained on the display of the receiver 4 from which the elevation of the target is determinable as described above. The elevation index produced by the trace is obtained by adding to the video signal an appropriately shaped pulse obtained from a pulse generator 118, and the elevation may be read directly from the meter 119 which is suitably calibrated.

The operation and purpose of the slope modifiers 8, 9, 10 and 11 of FIG. 1 will best be understood from FIG. 2 which shows two plots of voltage against time. The curve 21, shown in chain line, is one linear sawtooth in the output of the saw-tooth generator 5. The end-portion and beginning-portion of the preceding and following saw-teeth, respectively, are also shown in front of and after the curve 21. The period of the saw-tooth is equal to one line synchronization.

Theoretically, if it is assumed that no distortion occurs in the signal transmission between the camera and the receiver, the position of the bearing trace is solely dependent on the instant of operation of the pulse generator 18. This instant is dependent on the saw-tooth applied to the trip circuit 16 and, if a linear sawtooth is applied as shown at 21 in FIG. 2, the instant will be directly proportional to the reference voltage of the controller 20 as the rate of growth of the linear voltage curve 21 is directly proportional to time.

Unfortunately, distortions do occur at the optical image in the camera and in the signal transmission, and the bearing, signified by the position of the bearing trace, does not vary linearly with the voltage/time curve 21 in consequence. Thus, if the trip circuit 15 should be tripped by a linear saw-tooth voltage, the true bearing will not be signified by the voltage at which tripping occurs. As a result the reference voltage from the controller 20 will not vary linearly as the bearing alters and the bearing as read from the meter 19 will be inaccurate.

The function of the slope modifiers 8, 9, 10 and 11 is to provide the trip circuit 16 with a saw-tooth voltage which is not linear but is so shaped that the voltage read by the meter 19 is representative of the true bearing signified by the position of the bearing trace on the display of the television receiver 4.

Theoretically the non-linear saw-tooth curve applied to the trip circuit 16 is of the shape shown by the full line curve 22 in FIG. 2. From this curve it will be seen that a true bearing, represented by a time T, is denoted by a voltage W read from the meter 19 instead of a voltage V as would be the case were the linear saw-tooth curve 21 used. The difference in voltage between W and V is representative of the distortion produced during signal transmission and which must be compensated for, if the meter 19 is to give true bearings.

In practice curve 22 would be hard to produce and it is convenient to represent the curve as a series of chords, shown at 23 in FIG. 3, which can be obtained by simple electronic circuitry. The curve 23 corresponds closely to curve 22 (shown in broken line in FIG. 3) so that only very small errors are introduced by this approximation.

The curve 23 is produced as previously explained. Each line synchronizing pulse from the separator 2 is used to generate a set of regularly spaced impulses during each saw-tooth cycle. The impulses may be also produced by suitable means (not shown) such as multivibrator or a suitable delay line circuit. The impulses are integrated in the integrator 7 which comprises a resistance/capacitance integrating circuit into which different resistors from the slope modifiers 8, 9, 10 and 11 are individually insertable. The resistors are separately adjustable and are inserted into the integrator 7 by the selectors 12, 13, 14 and 15 respectively. Only one selector can operate at a time between successive impulses so that each time a fresh resistor is inserted into the integrator 7 the slope of the saw-tooth output waveform is changed.

The impulses integrated at 7 each give rise to an exponential voltage curve and only the initial part of each curve is used as here the curve is approximately linear and the gradient corresponds to (1/RC). The selectors 12, 13, 14 and 15 are operated by respective triggers on a sort of step-by-step counter previously described fed by the impulses, so that at predetermined instants in the saw-tooth cycle the gradient of the modified saw-tooth output from the integrator 7 changes as shown by the chords 23 in FIG. 3.

The apparatus described enables the bearing to be read directly from the meter 19, which suitably is a voltmeter, and to appear as a substantially vertical line on the receiver display.

If it is required to calibrate the apparatus the readings of meter 19 may be compared with known bearings and these may be obtained from optical markers by the method described in my co-pending U.S. Pat. application Ser. No. 341,134. Periodic checks should be made to ensure the meter readings of bearing and elevation are correct, and, if error does occur, it may be reduced empirically by adjusting the values of the capacitances or resistors introduced into the integrator 7 so that the curve 23 is modified further.

The voltages proportional to bearing and elevation obtained from the points 21 and 121 may be transmitted to remote stations such as remotely-controlled satellite monitoring sets.

It is to be understood that although the apparatus described refers to voltages such as would be used with electronic valve components, the apparatus may equally well be transistorised and in this case the references to "voltages" should be replaced by references to "intensities."

I claim:

1. Apparatus for measuring the bearing or elevation of a target displayed on a television screen, comprising a television camera for scanning the area of the target and providing a video signal to a receiver with a cathode ray tube, and, for each bearing or elevation axis, a first saw-tooth generator energised respectively during the synchronisation cycle of the receiver by a synchronising signal, a plurality of selectors comprising triggers successively actuated by a plurality of separate increasing voltages of said saw-tooth signal, a corresponding plurality of slope modifiers each comprising in series an electronic switch and a capacity or a resistance placed in parallel with respect to each other, an integrator R/C incorporating these capacities or resistances and providing a distorted saw-tooth signal, a trip circuit which operates when the voltage of said distorted saw-tooth signal exceeds an adjustable reference voltage and provides a pip signal, a voltmeter measuring said reference voltage, a generator of short pulses of predetermined length energized by said latter trip circuit, and a mixer for adding the video signal and said short pulse and suppling the whole to the T.V. receiver.

2. Apparatus according to claim 1, where the voltmeters are graduated respectively in bearing and elevation by comparison with the graduation of an optical marker.

* * * * *